May 25, 1954      A. MATTHEWS      2,679,628
APPARATUS FOR MEASURING MECHANICAL QUANTITIES
Filed Dec. 8, 1950      4 Sheets-Sheet 1

INVENTOR
ARNOLD MATTHEWS
BY
ATTORNEY

May 25, 1954  A. MATTHEWS  2,679,628
APPARATUS FOR MEASURING MECHANICAL QUANTITIES
Filed Dec. 8, 1950  4 Sheets-Sheet 2

INVENTOR
Arnold Matthews
BY
ATTORNEY

May 25, 1954 A. MATTHEWS 2,679,628
APPARATUS FOR MEASURING MECHANICAL QUANTITIES
Filed Dec. 8, 1950 4 Sheets-Sheet 4

INVENTOR
ARNOLD MATTHEWS
BY
ATTORNEY

Patented May 25, 1954

2,679,628

UNITED STATES PATENT OFFICE 2,679,628

APPARATUS FOR MEASURING MECHANICAL QUANTITIES

Arnold Matthews, Stretford, England, assignor to The General Electric Company Limited, London, England Application December 8, 1950, Serial No. 199,735

Claims priority, application Great Britain December 15, 1949

10 Claims. (Cl. 324—34)

This invention relates to apparatus for measuring mechanical quantities.

The invention is concerned in particular with such apparatus of the kind comprising a transformer, the mutual inductance between whose primary and secondary windings is variable in accordance with the magnitude of the quantity to be measured, whereby with a given primary current the secondary voltage will vary in accordance with the magnitude of the quantity to be measured. Apparatus of this kind may be used, for example, for measuring pressure, displacement, torque and other simialr mechanical quantities, or for measuring the thickness of non-magnetic coatings on magnetic materials.

In apparatus of this kind it has been usual in the past to measure the secondary voltage by rectifying it and measuring the rectified voltage with a D. C. instrument. The use of rectifiers, and particularly of metal rectifiers, leads to certain disadvantages due to the variability of the characteristics of the rectifiers and the difficulty of providing adequate compensation for such variability, thus making it impossible to obtain a high degree of accuracy in measurement. Furthermore the use of rectifiers makes it difficult to determine the sense of a quantity such as displacement or pressure difference as well as its absolute magnitude.

It is an object of the present invention to provide apparatus of the kind specified for measuring mechanical quantities with which measurements may be made to a substantially higher degree of accuracy than is the case with such apparatus using rectifiers.

It is a further object of the invention to provide apparatus of the kind specified for measuring mechanical quantities in which the dependence of the indication given on the frequency and magnitude of the current flowing through the primary winding of the transformer may be made comparatively small.

It is yet another object of the invention to provide apparatus of the kind specified for measuring mechanical quantities in which the sense of a quantity such as displacement or pressure difference, as well as its absolute magnitude, may be determined.

According to the present invention, in apparatus of the kind specified for measuring mechanical quantities, the indication of the magnitude of the quantity measured is given by the deflection from a predetermined position of the moving coil of a dynamometer type instrument having a core of magnetic material on which is wound a field winding which is fed with alternating current from the same source as the transformer primary winding, the moving coil being electrically connected in series with the transformer secondary winding.

In most cases the construction of the instrument is preferably such that the magnitude of the voltage induced in the moving coil from the field winding will vary substantially linearly with the deflection of the moving coil.

Two arrangements in accordance with the invention will now be described, by way of example with reference to the accompanying drawings, in which.

Figure 1:
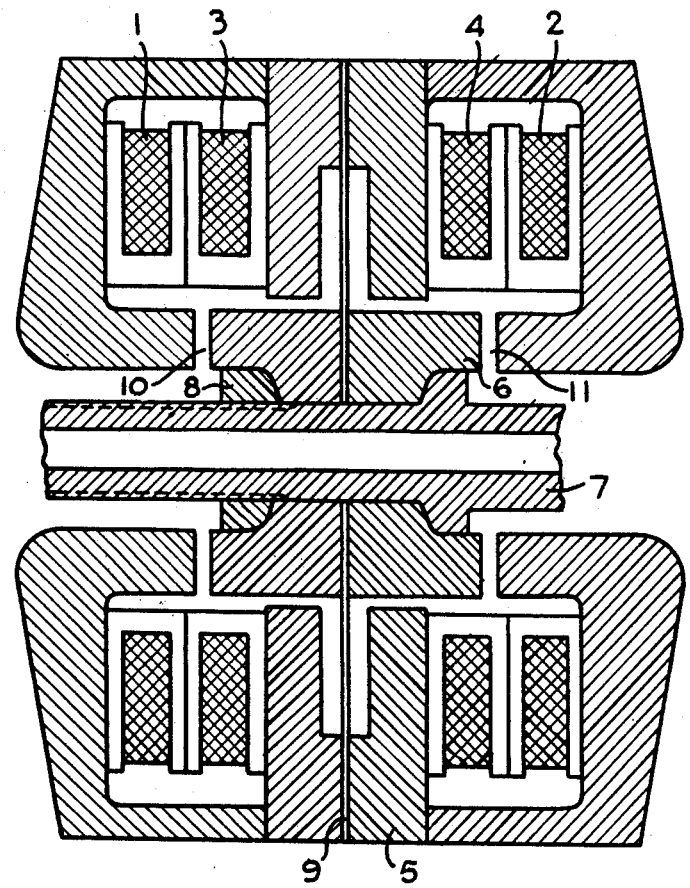
Figure 1 is a central section through an electromagnetic measuring head for use in measuring displacements or pressures.
Figure 2:
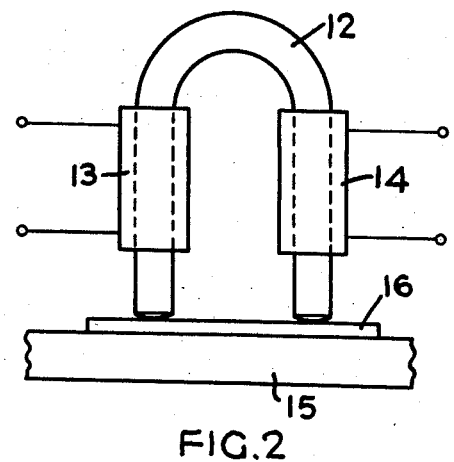
Figure 2 is a diagrammatic representation of an electromagnetic measuring head for use in measuring the thickness of non-magnetic coatings on magnetic materials.
Figure 3:
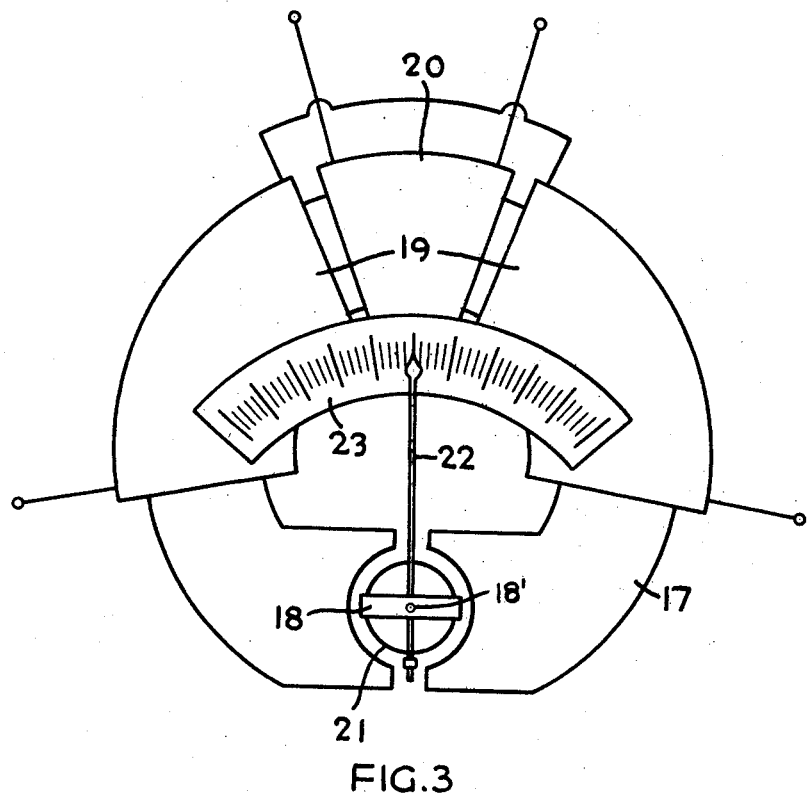

Figure 3 is a diagrammatic representation of an iron-cored dynamometer type instrument for use in connection with the measuring heads shown in Figures 1 and 2; and Figures 4, 5, 6, 7 and 8 are circuit diagrams of various arrangements in which the apparatus shown in Figures 1, 2 and 3 may be used.

In each arrangement apparatus consists essentially of two parts, an electromagnetic head and an iron-cored dynamometer type instrument. Referring to Figure 1, the measuring head in the first arrangement comprises a transformer having a primary winding in two sections 1 and 2 which are electrically connected in series with each other, and a secondary winding in two sections 3 and 4 which are electrically connected in series with each other in such a manner that the voltages developed across them when an alternating current is passed through the primary winding are opposite in phase. The transformer has a core surrounding the primary and secondary windings and comprising a fixed part 5 and a movable part 6 each built up from sections of magnetic material. The movable part 6 of the core is mounted on a spindle 7 by means of a locking nut 8, and is prevented from moving perpendicularly to the axis of the spindle 7 by means of a flexible metal spider 9. The spindle 7 is movable axially in correspondence with the magnitude of the quantity to be measured, in this case displacement or pressure, so that the position of the movable part 6 of the core corresponds to the magnitude of the quantity to be measured. Movement of the movable part 6 of the core varies the length of the air gaps 10 and 11 in the core, and thereby the mutual inductances between the section 1 of the primary winding and the section 3 of the secondary winding, and the section 2 of the primary winding and the section 4 of the secondary winding, respectively. Thus if an alternating current is passed through the primary winding, the secondary voltage will be zero if the movable part 6 of the core is centrally disposed with respect to the fixed part 5, and will increase from zero in opposite phases as the movable part 6 is moved to the right or left respectively from the central position.

Referring now to Figure 2, in the second arrangement the measuring head comprises a transformer having a U-shaped core 12 of magnetic material on the limbs of which are wound primary and secondary windings 13 and 14 respectively. In use the head is placed with the ends of the limbs of the core 12 against a specimen 15 of magnetic material which is under test, any non-magnetic coating 16 on the specimen thus forming two gaps in the magnetic circuit between the ends of the limbs of the core 12 and the specimen 15. Thus if an alternating current is passed through the primary winding 13, the secondary voltage will be inversely proportional to the total reluctance of the magnetic circuit. The reluctance increases with increase of thickness of the coating 16, and the secondary voltage therefore decreases with increase of thickness of the coating 16.

Turning now to Figure 3, in each arrangement the dynamometer includes a ring shaped core 17 of magnetic material having a gap in which is disposed the moving coil 18, and upon which are wound a field winding 19 and an auxiliary winding 20. The moving coil 18 is mounted on a spindle 18' for rotation in the gap in the core 17, and is provided with a core of magnetic material 21; the core 21 and the gap in the core 17 are shaped so that the moving coil 18 rotates in a substantially uniform radial magnetic field, so that the magnitude of the voltage induced in the moving coil 18 from the field winding 19 varies substantially linearly with respect to its angular position. The coil current is carried by ligaments (not shown) disposed so as to exert substantially no mechanical restoring torque on the moving coil system, and no other mechanical restoring torque is provided for the moving coil 18. It may, however, be desirable that there should be a slight mechanical unbalance in the moving coil system so that the moving coil 18 is returned to its zero position in the de-energized state of the apparatus. The moving coil 18 carries a pointer 22 which cooperates with a scale 23, which is disposed so that the voltage induced in the moving coil 18 from the field winding 19 is zero at half scale deflection of the pointer 22 (that is the position shown in Figure 3) and changes sign as the coil 18 rotates through this point.

The relative arrangement and operation of the two essential parts of the apparatus may be carried out in several different ways, some of which will now be discussed. The discussion will initially be concerned with apparatus incorporating a measuring head of the type shown in Figure 1, the quantity to be measured being assumed to be displacement. It will be assumed that the construction of the measuring head is such that for a given primary current the secondary voltage is directly proportional to the displacement D of the moving part 6 of the core from its central position.

Figure 4:
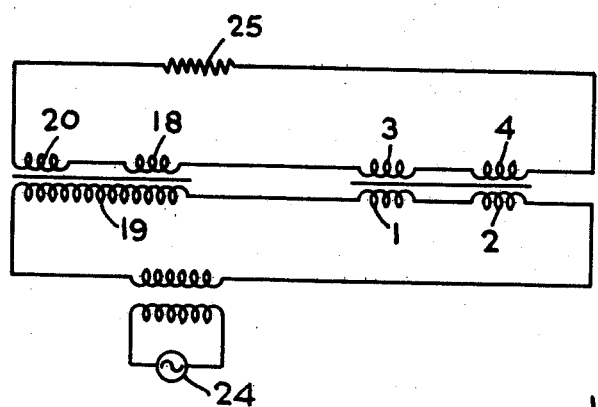

The first circuit to be considered is illustrated in Figure 4 of the drawings. In this circuit the primary winding 1, 2 of the measuring head and the dynamometer field winding 19 are connected in series and fed with an alternating current $I_1$ of frequency $\omega/2\pi$ from a source 24, and the head secondary winding 3, 4 and the moving coil 18 and auxiliary winding 20 of the dynamometer are all connected in series with a resistor 25.

The open circuit voltage of the auxiliary winding 20 is then given by:

$$E_A = -j\omega M_1 I_1$$

where $M_1$ is the mutual inductance between the field winding 19 and the auxiliary winding 20. If we assume that the zero position of the pointer 22 is at one end of the scale 23, the open circuit voltage of the moving coil 18 is given by:

$$E_m = -j\omega M_2 I_1 \left( \frac{\varphi}{\varphi_M} - \tfrac{1}{2} \right)$$

where $\varphi$ is the deflection of the pointer 22 from its zero position, $\varphi_M$ is the full scale deflection of the pointer 22, and $\omega M_2 I_1$ is the total change in the voltage between the zero position and full scale deflection. If the measuring head transformer were perfect the open circuit voltage of its secondary winding 3, 4 would be given by:

$$E_s = j\omega M_3 I_1 D/D_M$$

where $D_M$ is the maximum possible displacement in one direction of the moving part 6 of the core, and $M_3$ is the mutual inductance between the primary and secondary windings 1, 2 and 3, 4 when $D = D_M$. However, due to iron losses in the measuring head transformer the phase angle between the head primary current and secondary voltage differs considerably in general from 90° and therefore the expression $$E_s = (R_3 + j\omega M_3) I_1 D/D_M$$

must be used. It is assumed in the following analysis that $R_3$ is independent of $I_1$ and $\omega$.

The current flowing through the moving coil 18 is given by:

$$I_2 = (E_A + E_M + E_S)/Z \tag{1}$$

where $Z = R + j\omega L$ is the total impedance in the secondary circuit.

Furthermore, since no mechanical restoring torque is exerted on the moving coil 18, the following relation must be satisfied:

$$I_1 \times (\text{real part of } I_2) = 0 \tag{2}$$

From Equations 1 and 2 it can be shown that $$\theta = \frac{(RR_3 + \omega^2 L M_3) D/D_M + \omega^2 L(\tfrac{1}{2}M_2 - M_1)}{\omega^2 M_2 L/\theta_M} \tag{3}$$

It will thus be seen that $\varphi$ varies linearly with D, and is in general dependent upon the frequency of the primary current but is independent of the magnitude of the primary current.

Figure 5:
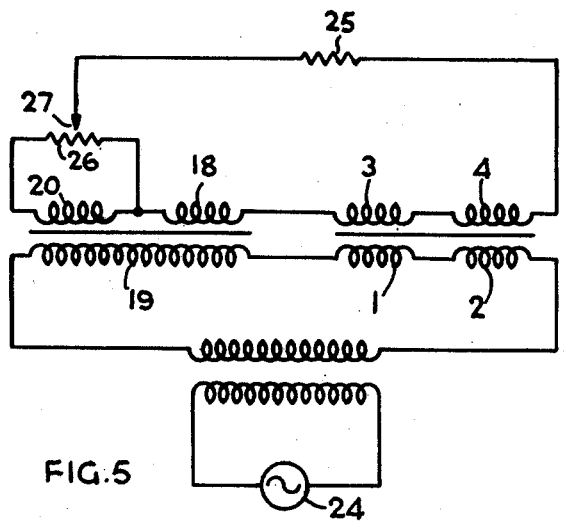

From Equation 3 it will be seen that if $\varphi$ is to be zero when D is zero it is necessary either to make $M_1$ equal to $\tfrac{1}{2}M_2$ or to make the effective value of L zero. In practice the former alternative is more convenient, and allows the use of a simple method of zero adjustment. This is carried into effect, as is shown in Figure 5, by connecting a resistor 26 across the auxiliary winding 20 and connecting part only of the resistor 26 in series with the transformer secondary winding 3 and 4 and the moving coil 18 by means of a variable tapping 27 on the resistor 26. The quantity $M_1$ must then be replaced in Equation 3 by $xM_1$ where $x$ is less than unity, and by varying the tapping 27 on the resistor 26, $xM_1$ can be made equal to $\tfrac{1}{2}M_2$, so that Equation 3 becomes:

$$\theta = \frac{(RR_3 + \omega^2 LM_3) D\theta_M}{\omega^2 M_2 L D_M} \qquad (4)$$

Since negative values of $\varphi$ cannot be measured in the arrangement so far described, it will be seen from Equation 4 that the absolute magnitude of D can only be determined for positive values of D. If it is desired to ascertain the absolute magnitude and sense of D for both positive and negative values of the displacement D, the zero position of the pointer 22 may be taken at the centre of the scale 23. The open circuit voltage of the moving coil 18 is then given by:

$$E_M = -j\omega M_2 I_1 \varphi^1 / \varphi_M$$

where $\varphi^1$ (which may be positive or negative) is the deflection of the pointer 22 from its zero position, and $M_2$ and $\varphi_M$ have the same significance as before.

It can then be shown that Equation 3 must be replaced by:

$$\varphi^1 = \frac{(RR_3 + \omega^2 LM_3) D/D_M - \omega^2 LM_1}{\omega^2 M_2 L/\varphi_M} \qquad (3^1)$$

Figure 6:
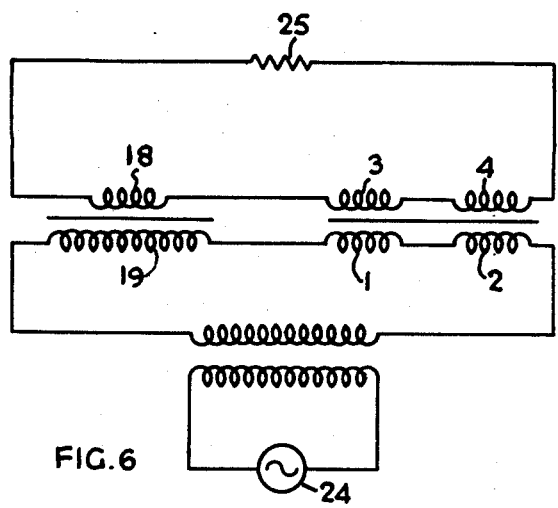

Thus if $\varphi^1$ is to be zero when D is zero $M_1$ must be made zero. Thus the auxiliary winding 20 must be disconnected and the required circuit is as shown in Figure 6. Equation $3^1$ then becomes:

$$\varphi^1 = \frac{(RR_3 + \omega^2 LM_3) D\theta_M}{\omega^2 M_2 L D_M} \qquad (4^1)$$

which is of the same form as Equation 4. Since both positive and negative values of $\varphi^1$ are possible in Equation $4^1$ the sign of D as well as its absolute magnitude may be determined.

Since Equation $4^1$ is of the same form as Equation 4, it will no longer be considered independently of Equation 4.

If some method of correcting for the impurity of the mutual inductance of the measuring head is adopted, and the value of $R_3$ is thereby reduced to zero, then Equation 4 becomes:

$$\varphi = \frac{M_3 D \varphi_M}{M_2 D_M} \qquad (5)$$

Figure 7:
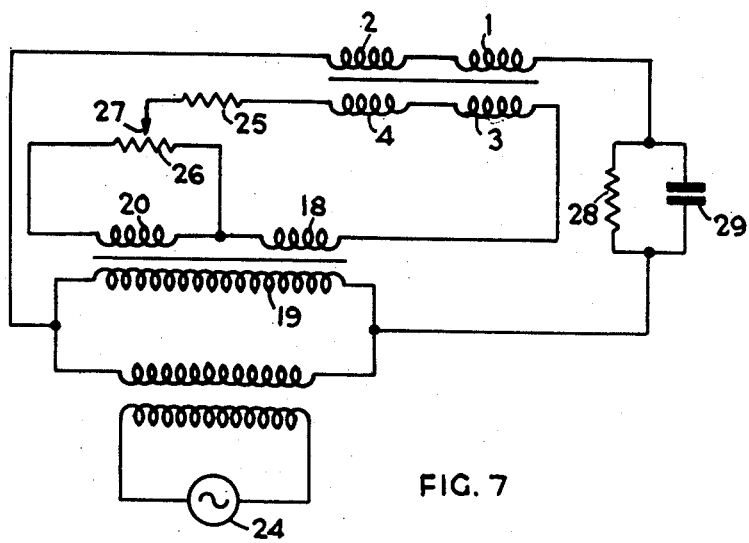

Under these conditions $\varphi$ is independent of both the magnitude and frequency of the primary current, but the sensitivity is rather low. This arrangement may be achieved in practice, as shown in Figure 7, by connecting the transformer primary winding 1, 2 and the dynamometer field winding 19 in parallel instead of in series and connecting in series with the transformer primary winding 1, 2 a parallel combination of a resistor 28 and a capacitor 29. The quantity $M_2$ in Equation 5 must be replaced by $yM_2$ where $y$ depends upon the relative magnitudes of the currents flowing through the transformer primary winding 1, 2 and the field winding 19 respectively. By reducing the latter current the value of $yM_2$ may be made smaller and thus the sensitivity may be increased. However, in practice there is a limit to the increase in sensitivity which can be obtained in this way since the electrical restoring torque of the dynamometer is directly proportional to $(yM_2)^2$ and it is undesirable in practice to reduce the electrical restoring torque below a certain value.

Figure 8:
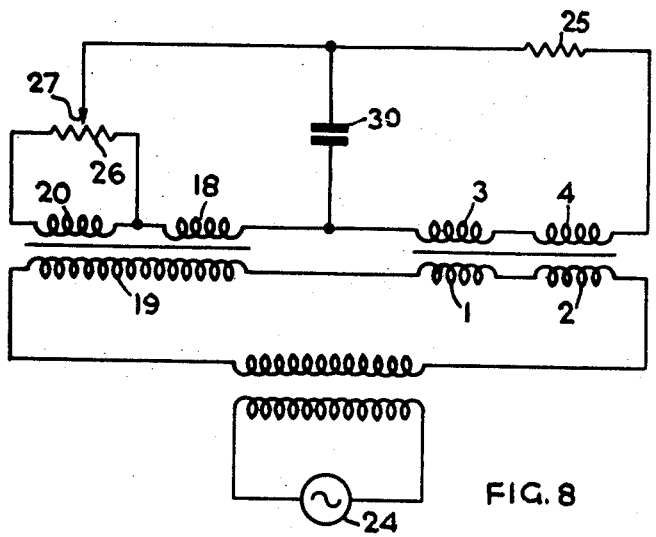

The effective value of L may be changed in practice by connecting a capacitor 30 in the secondary circuit, for example in parallel with the secondary winding 3, 4 and the resistor 25 as is shown in Figure 8. From Equation 4 it can be seen that, as L approaches zero with no mechanical restoring torque, the sensitivity tends to infinity. However the sensitivity obtainable by this means is once again limited by consideration of the minimum permissible electrical restoring torque, since the restoring torque is directly proportional to L. However the maximum sensitivity which can be obtained by this method is considerably greater than the maximum sensitivity of the arrangement shown in Figure 7 and governed by Equation 5, though in this case the deflection $\varphi$ will be dependent upon the frequency of the primary current.

It will be appreciated that in the arrangement described above the measuring head shown in Figure 1 may be used for measuring pressures as well as displacements. For example, the spindle 7 may be mechanically connected to a flexible diaphragm between two chambers filled with gas, so that the displacement of the moving part 6 of the core depends on the displacement of the diaphragm, and therefore on the pressure difference between the two chambers.

The second arrangement referred to above, in which the measuring head shown in Figure 2 is used, will now be considered. The circuit to be considered initially is the same as that shown in Figure 4, except that the windings 1, 2 and 3, 4 are replaced by the windings 13 and 14 respectively.

The open circuit voltage of the auxiliary winding 20 is again given by:

$$E_A = -j\omega M_1 I_1$$

The open circuit voltage of the moving coil 18 is again given by:

$$E_M = -j\omega M_2 I_1 \left(\frac{\varphi}{\varphi_M} - \tfrac{1}{2}\right)$$

If the measuring head transformer were perfect the open circuit voltage of its secondary winding 14 would be given by:

$$E_S = j\omega M_0 I_1 / (1 + At)$$

where $t$ is the thickness of the coating 16, A is a constant, and $M_0$ is the mutual inductance between the primary and secondary windings 13 and 14 when $t=0$. However, owing to the iron losses in the measuring head transformer the expression $$E_S = (R_0 + j\omega M_0) I_1 / (1 + At)$$

must be used. It is assumed that $R_0$ is independent of $I_1$ and $\omega$.

The equation $$\theta = \frac{(RR_0 + \omega^2 LM_0)/(I + At) + \omega^2 L(\tfrac{1}{2}M - M_1)}{\omega^2 M_2 L/\theta_M} \qquad (6)$$

can then be derived in the same way as Equation 3.

There will in general be some thickness T of the coating 16 which will be the maximum to be measured, and it is desirable to make $\varphi$ zero when $t=T$. It can be seen from Equation 6 that this is the case if $$\frac{(RR_0 + \omega^2 LM_0)}{(I + AT)} = \omega^2 L(M_1 - \tfrac{1}{2}M_2) \qquad (7)$$

Thus the required zero adjustment may be carried out in the same manner as in the circuit shown in Figure 5, the quantity $M_1$ in Equations 6 and 7 being replaced by $xM_1$ as before.

Further analysis of the arrangement may be carried out in a similar manner to that used above in connection with the arrangement in which the measuring head shown in Figure 1 is used, but the details will not be repeated here.

In both arrangements further dynamometer type instruments may be connected in the circuit so that indications may be given at more than one point of the magnitude of the quantity to be measured. In such cases the field coils 19 of all the dynamometers will be connected in parallel with each other, and the moving coils 18 of all the dynamometers will be connected in parallel with each other.

I claim:

1. Apparatus for measuring mechanical quantities comprising: a transformer having primary and secondary windings the mutual inductance between which is variable in accordance with the magnitude of the quantity to be measured; a dynamometer type instrument comprising a moving coil electrically connected in series with the transformer secondary winding, a core of magnetic material having a gap in which said moving coil is disposed, a mounting for the moving coil, said mounting constraining the moving coil to rotate in said gap while exerting substantially no mechanical restoring torque on the moving coil, a field winding wound on the core, and means for indicating the deflection of the moving coil from a predetermined position; and means for feeding both the field winding and the transformer primary winding with alternating current from the same source.

2. Apparatus according to claim 1, in which the moving coil is provided with a core of magnetic material, and this core and the gap in the core on which the field winding is wound are shaped to produce between them a substantially uniform radial magnetic field in which the moving coil is arranged to rotate.

3. Apparatus according to claim 2, including a pointer carried by the moving coil, and a scale cooperating with the pointer, the moving coil being arranged to rotate through a position in which the voltage induced in the moving coil from the field winding is zero, the pointer in this position of the moving coil corresponding to the central point of the scale.

4. Apparatus according to claim 1, in which the field winding is electrically connected in series with the transformer primary winding and the alternating current source.

5. Apparatus according to claim 1, in which the field winding is electrically connected in parallel with the transformer primary winding and the alternating current source.

6. Apparatus according to claim 5, in which a parallel combination of a resistance and a capacitance is electrically connected in series with the transformer primary winding, the values of the resistance and capacitance being such as to correct for the impurity of the mutual inductance between the primary and secondary windings of the transformer.

7. Apparatus according to claim 1, in which a capacitance is electrically connected in the circuit comprising the moving coil and the transformer secondary winding so that the effective series reactance of this circuit has a predetermined value.

8. Apparatus for measuring mechanical quantities comprising: a first transformer having primary and secondary windings the mutual inductance between which is variable in accordance with the magnitude of the quantity to be measured; a dynamometer type instrument comprising a moving coil electrically connected in series with the secondary winding of the first transformer, a core of magnetic material having a gap in which said moving coil is disposed, a mounting for the moving coil, said mounting constraining the moving coil to rotate in said gap while exerting substantially no mechanical restoring torque on the moving coil, a field winding wound on the core, and means for indicating the deflection of the moving coil from a predetermined position; a second transformer having primary and secondary windings; means for feeding the field winding and the primary windings of both the first and second transformers with alternating current from the same source; and means for injecting at least part of the voltage developed across the secondary winding of the second transformer in series into the circuit comprising the moving coil and the secondary winding of the first transformer.

9. Apparatus according to claim 8, including means for varying the magnitude of said part of the voltage developed across the secondary winding of the second transformer.

10. Apparatus according to claim 8, in which the primary winding of the second transformer is constituted by the field winding and the secondary winding of the second transformer is constituted by an auxiliary winding wound on the core of the dynamometer type instrument.

References Cited in the file of this patent

UNITED STATES PATENTS

| Number | Name | Date |
|---|---|---|
| 1,686,815 | Imes | Oct. 9, 1928 |
| 1,807,411 | Imes | May 26, 1931 |
| 1,897,634 | De Forest | Feb. 14, 1933 |
| 1,906,551 | De Forest | May 2, 1933 |
| 2,320,761 | Tait et al. | June 1, 1943 |